US007010632B2

(12) United States Patent
Floman

(10) Patent No.: US 7,010,632 B2
(45) Date of Patent: Mar. 7, 2006

(54) OPERATING MEMORY COMPONENTS

(75) Inventor: Matti Floman, Kangasalaa (FI)

(73) Assignee: Nokia Corporation, Espoo (FI)

( * ) Notice: Subject to any disclaimer, the term of this patent is extended or adjusted under 35 U.S.C. 154(b) by 253 days.

(21) Appl. No.: 10/729,873

(22) Filed: Dec. 5, 2003

(65) Prior Publication Data

US 2004/0199741 A1   Oct. 7, 2004

(30) Foreign Application Priority Data

Dec. 5, 2002   (WO) ...................... PCT/IB02/05134

(51) Int. Cl.
*G06F 13/00* (2006.01)
*G06F 13/40* (2006.01)
(52) U.S. Cl. .................... 710/104; 710/305; 711/170
(58) Field of Classification Search ................ None
See application file for complete search history.

(56) References Cited

U.S. PATENT DOCUMENTS

| 5,734,843 | A  | * | 3/1998  | Gephardt et al. ........... 710/107 |
| 5,862,359 | A  | * | 1/1999  | Nozuyama ................... 710/316 |
| 6,618,777 | B1 | * | 9/2003  | Greenfield .................. 710/120 |
| 6,662,260 | B1 | * | 12/2003 | Wertheim et al. ........... 710/316 |
| 6,769,046 | B1 | * | 7/2004  | Adams et al. ............... 710/316 |
| 6,889,275 | B1 | * | 5/2005  | Vandecappelle et al. .... 710/107 |

FOREIGN PATENT DOCUMENTS

| EP | 1 132 819 A2 | 9/2001 |
| JP | 11-065991    | 3/1999 |
| JP | 11-259417    | 9/1999 |
| WO | WO 9315464 A1 * | 8/1993 |
| WO | WO 9913407 A1 * | 3/1999 |

OTHER PUBLICATIONS

Jiang et al.; "PPMB: A Partial-Multiple-Bus Multiprocessor Architecture with Improved Cost-Effectiveness", IEEE Transactions on Computers; vol. 41, No. 3; Mar. 1992; pp. 361-366.*

Tu et al.; "Network Simulations of a General Class of Partial-connection Multiple-bus Systems"; 7th International Symposium on Modeling, Analysis and Simulation of Computer and Telecommunication Systems; 1999.*

* cited by examiner

*Primary Examiner*—Paul R. Myers
*Assistant Examiner*—Ryan Stiglic
(74) *Attorney, Agent, or Firm*—Alfred A. Fressola; Ware, Fressola, Van Der Sluys & Adolphson LLP

(57) ABSTRACT

A hardware unit (2) for operating memory components comprises a memory controller, a bus and a plurality of interface pins 3–6. The bus is connected to the memory controller and to the interface pins. In order to enable a flexible employment of the hardware unit, the memory controller determines the number of memory components (21,31,41,42,51,52,61,62) connected to the interface pins. In case at least one memory component is determined, the memory controller divides the capacity of the bus into as many portions as there are connected memory components, allocates each portion to another group of interface pins to which a separate memory component is connected, and exchanges signals via the bus and the interface pins separately with each connected memory component. The invention relates equally to an electronic device 1 comprising such a hardware unit and to a corresponding method.

22 Claims, 4 Drawing Sheets

OPERATING MEMORY COMPONENTS

CROSS REFERENCE TO RELATED APPLICATIONS

This application claims priority under 35 USC §119 to International Patent Application No. PCT/IB02/05134 filed on Dec. 5, 2002.

FIELD OF THE INVENTION

The invention relates to a hardware unit for operating memory components, in particular mass memory components. The hardware unit comprises a memory controller, a plurality of interface pins and a bus connected to both, memory controller and interface pins. The invention is equally related to an electronic device comprising such a hardware unit and to a method for operating memory components.

BACKGROUND OF THE INVENTION

Many electronic devices, including portable devices, enable the use of mass memory components.

The actual access to such a mass memory component for reading and writing operations is usually controlled by an ASIC (Application Specific Integrated Circuit) in the electronic device. The ASIC comprises to this end a memory controller, the functionality of which is implemented partly with software and partly with hardware, and a bus connected on the one hand to the memory controller and on the other hand to interface pins of the ASIC. The term memory controller is used in this document for referring to an entity which provides memory interface functions between a CPU (central processing unit) and a memory. The memory bus is not included in this memory controller. The bus in the ASIC is employed for transferring control signals and data to and from a mass memory component connected to the interface pins under the control of the memory controller using a dedicated interface protocol. The mass memory component can be an internal mass memory component, which is integrated into the electronic device and connected to the interface pins. Alternatively, the mass memory component can be an external mass memory component, which is connected to the interface pins via an external interface of the electronic device.

Most known approaches have the disadvantage that the employed ASIC is designed exclusively for a specific implementation of the electronic device. Thus, the possibilities of employing the ASIC are rather limited.

In one more flexible known approach, the ASIC comprises a narrow bus to which two mass memory components can be connected in parallel via the interface pins of the ASIC. But the ASIC considers the memory components as a single memory component. The reading and writing operations are carried out for all of the memory components at the same time, not separately. This prevents for example that data provided by the electronic device is stored in a specific one of the memory components for later use with some other electronic device. Moreover, this implementation of the ASIC allows only the use of either two external memory components or two internal memory components, not the simultaneous use of an internal and an external memory component.

In another known approach, some interface pins of an ASIC which are provided for an interface associated to a first interface protocol are used in addition for an interface associated to a second interface protocol. If a large number of pins is used for one of the interfaces, then there is only a small number of interface pins left for the other interface, and it is not possible to use large memory components with this other interface, since there are not enough interface pins for supporting a large memory component. It is moreover a disadvantage of this approach that a different interface protocol is used for each interface and that each interface protocol requires a dedicated bus in the ASIC.

SUMMARY OF THE INVENTION

It is an object of the invention to increase the flexibility in the use of a hardware unit enabling an access to memory components.

This object is reached according to the invention with a hardware unit for operating memory components, in particular mass memory components, which comprises a memory controller, a plurality of interface pins and a bus connected on the one hand to the memory controller and on the other hand to the interface pins. It is proposed that the memory controller first determines the number of memory components external to the hardware unit and connected to the interface pins, if any. In case at least one memory component is determined to be connected to the interface pins, the memory controller divides the capacity of the bus into as many portions as there are connected memory components. The memory controller then allocates each portion to another group of the interface pins to which a separate memory component is connected. Only then, the memory controller exchanges signals via the bus and the interface pins separately with each connected memory component.

The object of the invention is equally reached with an electronic device comprising the proposed hardware unit and with a method for operating memory components, which method comprises corresponding steps.

The invention proceeds from the idea that a memory controller in a hardware unit is able to control several mass memory components via a single bus of the hardware unit, but nevertheless individually, if the capacity of the bus is first divided into distinct portions, each portion being allocated to one of the mass memory components.

The memory controller divides the capacity of the bus according to the needs which the respective implementation of an electronic device in which the hardware unit is integrated requires. Thus, the hardware unit can be employed very flexibly in different kinds of implementations of an electronic device. More specifically, it can be employed for accessing various numbers and kinds of mass memories. At the same time the number of interface pins can be kept rather low, and the same interface protocol can be employed by the memory controller for all memory components.

Preferred embodiments of the invention become apparent from the dependent claims.

In a first, preferred embodiment of the invention, the memory controller determines the number of connected memory components based on a preprogrammed value to which it has access. The preprogrammed value can be stored for instance in a boot ROM (Read Only Memory) or in an internal, non volatile register of the hardware unit. At the same location, an indication on the type of the connected memory components may be available to the memory controller, i.e. an indication on whether connected memory components are components internal or external to an electronic device in which the hardware unit is included.

In a second alternative, the memory controller may determine the number and possibly the kind of connected memory components in an identification cycle via the bus and the interface pins of the hardware unit. It has to be noted, however, that the requirements for ESD (electrostatic discharge) components in the case of external memory components limit the feasibility of employing such an identification cycle. In case an external interface is supported, then the interface pins of the hardware unit connected to the external interface need to have ESD protection and can therefore not be compared with internally used interface pins, which do not require an ESD protection.

It is possible to attach to the same interface pins of the hardware unit one or more memory components which are internal to an electronic device in which the hardware unit is integrated, one or more memory components which are external to an electronic device in which the hardware unit is integrated, or a combination of at least one external and at least one internal memory component.

Further, fast and slow mass memory components can be used as external and/or internal mass memories attached to the bus. As mentioned above, it is possible to support a variety of implementations of electronic devices with one fixed hardware unit according to the invention. In one design of an electronic device, it is possible to drive the internal memory fast or the external memory slow without making any changes to the hardware unit, assuming that the design of the electronic device includes a required ESD protection. For example, once the interface pins of the hardware unit are split between an internal and an external interface, the hardware unit may operate an external mass memory component with a reasonable performance, and at the same time a fast internal mass memory component. In the case of a single internal or external memory component, a fast bus may be provided which uses all of the interface pins that are available for an exchange of data. If the entire capacity of the bus is provided for a very fast single memory component attached to the bus, a maximum performance can be achieved for a single memory component.

In the whole, a maximum parallelism is enabled with the invention.

In an advantageous embodiment, the interface pins of the hardware unit are general I/O (input/output) pins. Thereby, it is even possible to use the interface pins for some other application, in case neither external nor internal mass memory components are to be used.

For operating a memory component, control signals are required in addition to the data that is to be written into the memory or read from the memory. The invention is particularly suited for applications in which the amount of control signals is rather small. Regarding the control signals, there are mainly two possibilities of implementing the bus in the hardware unit. In one embodiment, the control signals from the memory controller are not multiplied, e.g. doubled. This limits the flexibility of the hardware unit, since the performance of connected memory components is limited by the capacity coming from ESD protection components. In case only an internal mass memory component is used, ESD components are not required and the bus speed can be higher. In a second, preferred embodiment, the control signals from the memory controller are multiplied. In this case, the internal performance is not limited and a simultaneous, but separate parallel usage of memory components is possible. In practice, a doubling of control signals can be realized by providing two mass storage blocks for the memory controller. The two blocks can be working as a one, using only one set of control pins and in addition the full set of data pins. Alternatively, the two blocks can be working as separate blocks, each using another set of control pins and half of the data pins.

Preferably, the hardware unit uses the same interface protocol for any mass memory component that may be connected to its interface pins. Some protocols, like the MultiMediaCard protocol, allow to connect several components at the same time to the same interface. This means that each separate memory component connected to interface pins to which a portion of the bus capacity is allocated may consist of one or more sub-component(s). In that case, a separate identification cycle is performed by the hardware unit for identifying these sub-components.

The hardware unit can be realized in particular in the form of a chip which comprises only the memory control functionality or in addition some other functionalities, like a standard processor chip. In case the chip is realized as an ASIC, the memory controller enables typically only one of the functions of the ASIC, not the main function. In case the hardware unit is realized in form of a chip which has to co-operate with a main processor of an electronic device, for instance of a PC, there has to be some agreed interface between the processor and the chip.

The invention can be employed for stationary devices like PCs as well as for portable devices like mobile phones, digital cameras or portable computers.

BRIEF DESCRIPTION OF THE FIGURES

Other objects and features of the present invention will become apparent from the following detailed description considered in conjunction with the accompanying drawings, wherein.

DETAILED DESCRIPTION OF THE INVENTION

Figure 1:
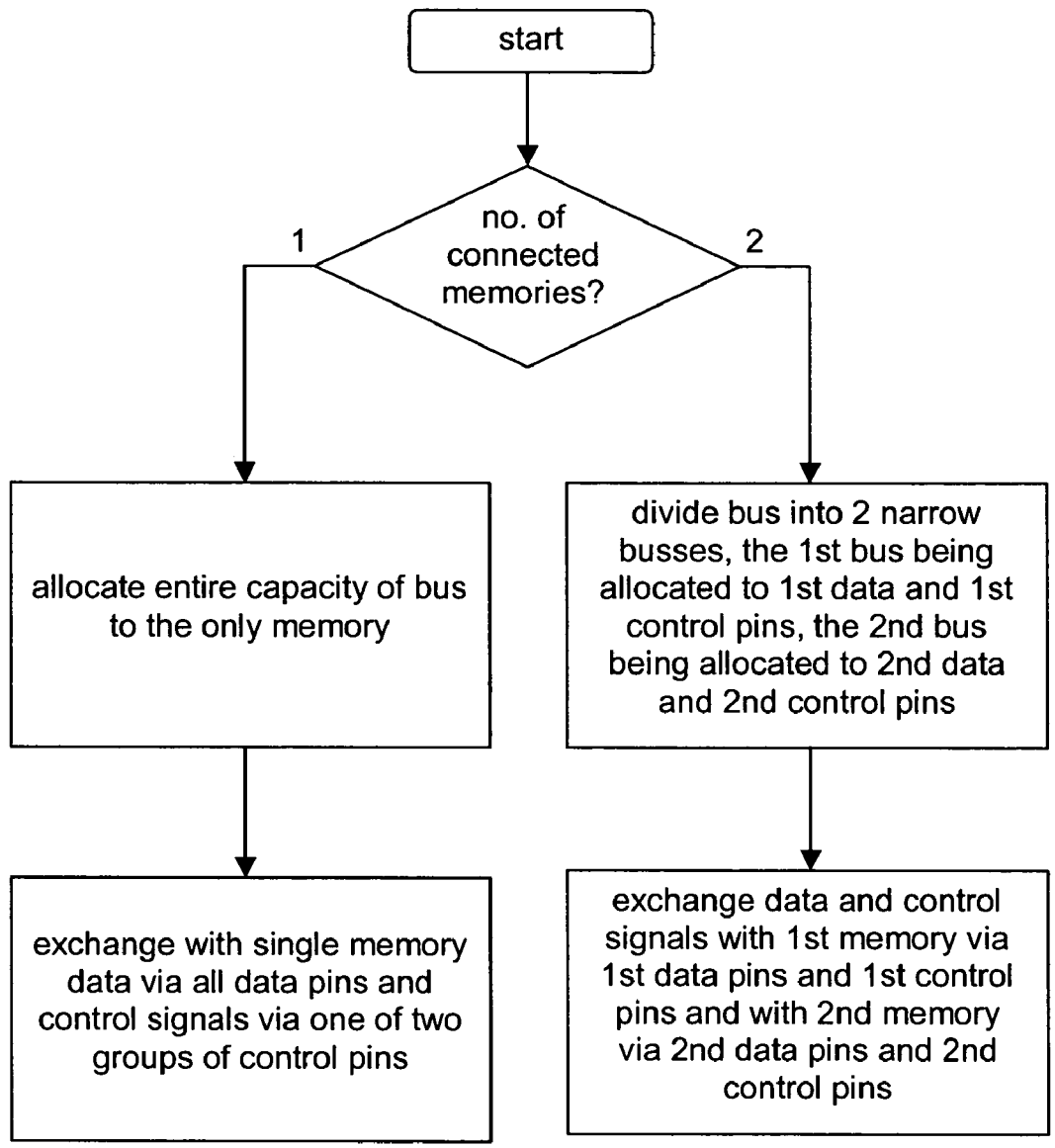
FIG. 1 is a flow chart illustrating a method implemented in an embodiment of the hardware unit according to the invention.

FIG. 1 is a flow chart illustrating a method which is implemented in an embodiment of a hardware unit according to the invention. The method will be described under consideration of different implementations of an electronic device in which the hardware unit is employed. These implementations of an electronic device are illustrated schematically in FIGS. 2 to 6.

Each of FIGS. 2 to 6 shows a portable device 1 as an embodiment of the electronic device according to the invention. The portable device will be referred to as the host. The host 1 includes an ASIC 2 as an embodiment of the hardware unit according to the invention. The ASIC 2 comprises a software and hardware based memory controller, a bus and interface pins 3–6. The memory controller and the interface pins 3–6 are connected within the ASIC 2 to the bus. A first and a second group 3, 4 of y interface pins each are destined for a data exchange with one or more mass memory components, while a third and a fourth group 5, 6 of x interface pins each are destined for an exchange of control signals with one or more mass memory components. The first and second group 3, 4 of interface pins can each comprise e.g. y=4 pins, while the third and fourth group 5, 6 of interface pins can each comprise e.g. x=2 pins, thus there may be e.g. a total of 12 interface pins. Each mass memory component connected to the ASIC 2 is connected to one group 5, 6 of interface pins destined for an exchange of control signals and to at least one group 3, 4 of interface pins destined for an exchange of data.

In a first step indicated in FIG. 1, the memory controller of the ASIC 2 determines the number of memory components connected to its interface pins 3–6. This can be achieved e.g. by retrieving a corresponding preset value from a boot ROM of the electronic device 1 or from a non volatile register of the ASIC 2. The kind of the connected memory components may be stored as well, and may be retrieved in addition by the ASIC 2. Alternatively, the ASIC 2 may determine the number of memory components connected to its interface pins 3–6 in an identification cycle via the bus and the interface pins 5, 6 associated to control signals. In this case, the ASIC 2 may receive from each connected memory component not only an indication that a mass memory component is connected, but as well an indication of the kind of mass memory component it constitutes. The possible resulting values of the number of connected memory components can be zero, one or two. The memory controller is only further involved, in case at least one memory component is connected to the ASIC 2.

Figure 2:
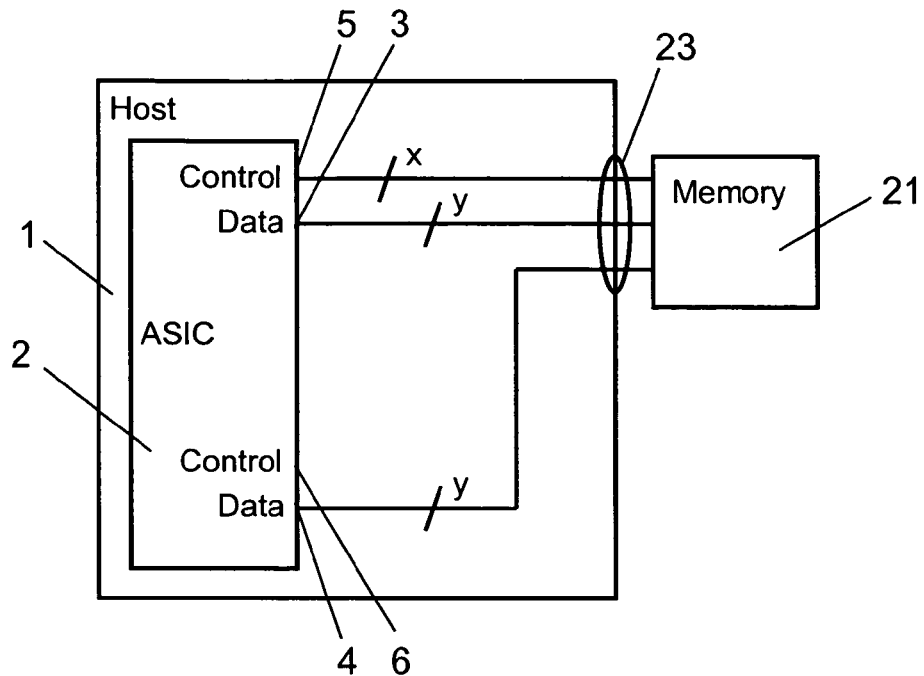
FIG. 2 is a block diagram illustrating a first host implementation making use of the embodiment of the hardware unit according to the invention.
Figure 3:
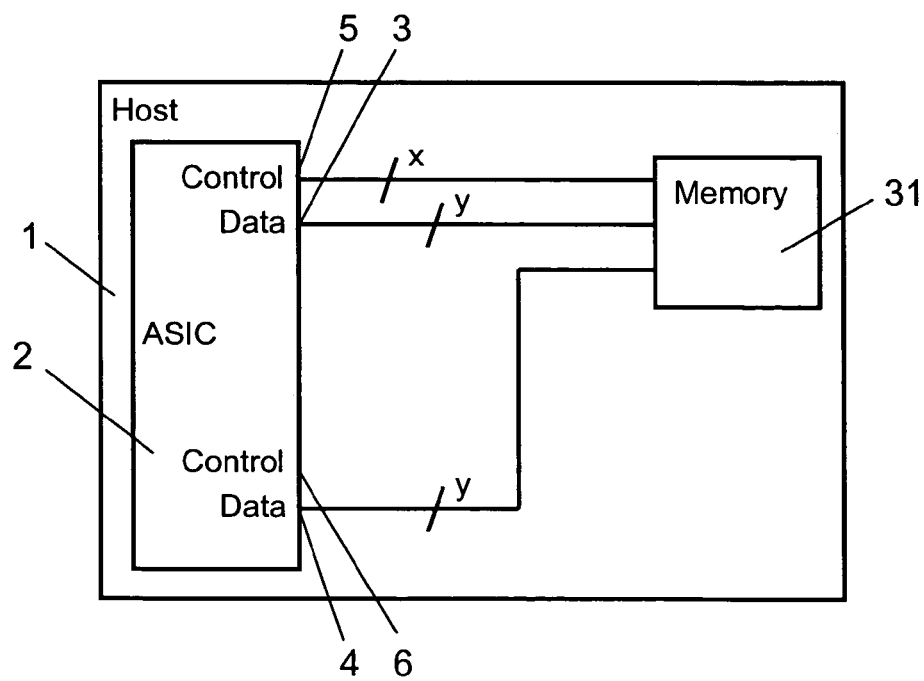
FIG. 3 is a block diagram illustrating a second host implementation making use of the embodiment of the hardware unit according to the invention.

Possible implementations in which a single memory component is connected to the ASIC 2 are depicted in FIGS. 2 and 3. In FIG. 2, a single external mass memory component 21 is connected by means of a wide bus to an external, interface 23 of the host 1 and further to the first, second and third group of interface pins 3–5 of the ASIC 2. An ESD protection is provided for these pins of the first, second and third group of interface pins 3–5.

In FIG. 3, the host 1 itself comprises an internal mass memory component 31, which is connected by means of a wide bus to a the first, second and third group of interface pins 3–5 of the ASIC 2.

In case the memory controller of the ASIC 2 determines that a single memory component 21, 31 is connected to the interface pins 3–6, it assigns the entire capacity of its bus to this memory component 21, 31. Thereby, a wide, fast bus is provided.

Then, the memory controller starts an exchange of data with the memory component 21, 31 via interface pin groups 3 and 4 and an exchange of associated control signals via interface pin group 5. It uses to this end an available interface protocol, which is the same for the implementation in FIG. 2 and the implementation in FIG. 3. Since the entire capacity of the bus is available for the connected memory component 21, 31 and since two groups 3, 4 of interface pins can be used for exchanging data with the connected memory device 21, 31, a fast data transfer is enabled, and thus the single memory component 21, 31 is preferably a fast memory component which supports a fast data transfer.

Figure 4:
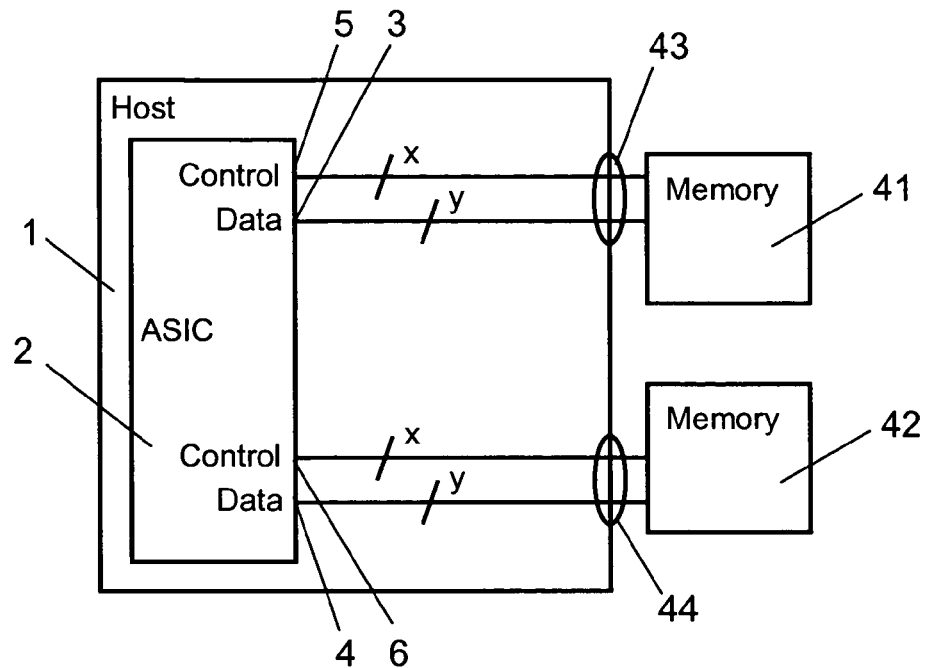
FIG. 4 is a block diagram illustrating a third host implementation making use of the embodiment of the hardware unit according to the invention.
Figure 5:
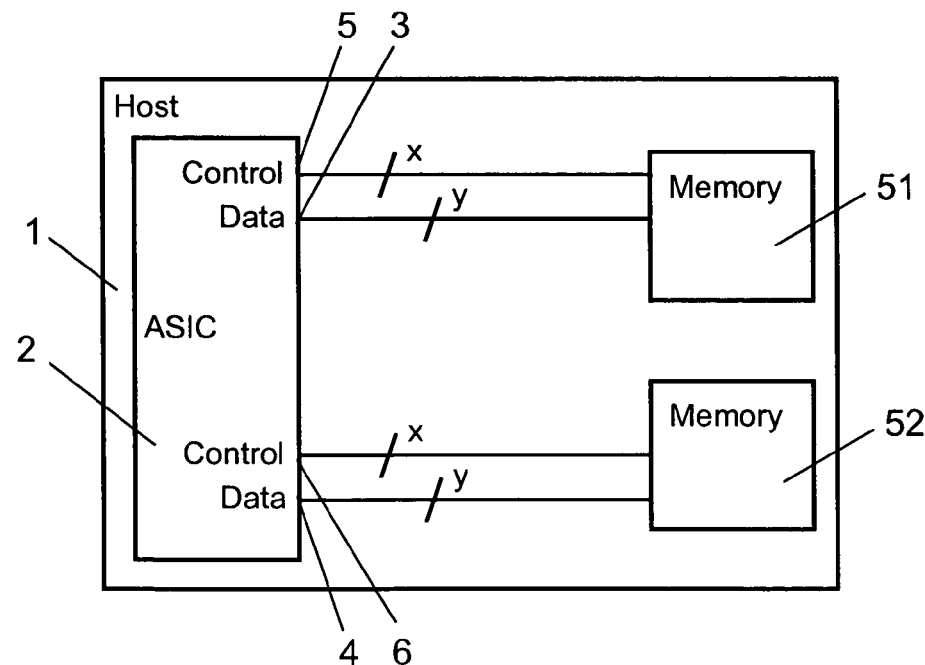
FIG. 5 is a block diagram illustrating a fourth host implementation making use of the embodiment of the hardware unit according to the invention.
Figure 6:
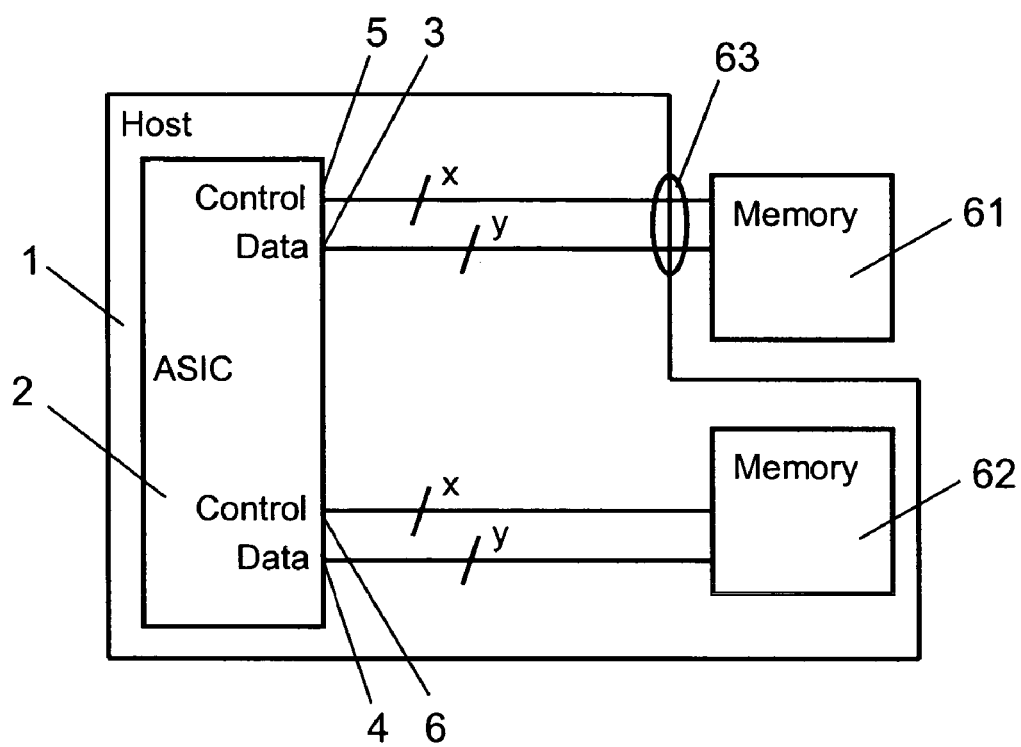
FIG. 6 is a block diagram illustrating a fifth host implementation making use of the embodiment of the hardware unit according to the invention.

Possible implementations in which two memory components are connected to the ASIC 2 are depicted in FIGS. 4 to 6.

In FIG. 4, a first external mass memory component 41 is connected by means of a narrow bus to a first external interface 43 of the host 1 and further to the first and the third group 3, 5 of interface pins of the ASIC 2, while a second external mass memory component 42 is connected by means of a narrow bus to a second external interface 44 of the host 1 and further to the second and the fourth group 4, 6 of interface pins of the ASIC 2. In this case, an ESD protection is provided for all interface pins 3–6 of the ASIC 2.

In FIG. 5, the host 1 comprises two internal mass memory components 51, 52. The first internal mass memory component 51 is connected by means of a narrow bus to the first and the third group of interface pins 3, 5 of the ASIC 2, while the second internal mass memory component 52 is connected by means of a narrow bus to the second and the fourth group 4, 6 of interface pins of the ASIC 2.

In FIG. 6, finally, an external mass memory component 61 is connected by means of a narrow bus to an external interface 63 of the host 1 and further to the first and the third group of interface pins 3, 5 of the ASIC 2. In addition, the host 1 comprises an internal mass memory component 62 which is connected by means of a narrow bus to the second and the fourth group 4, 6 of interface pins of the ASIC 2. An ESD protection is provided for the pins of the first and third group of interface pins 3, 5.

In case the memory controller of the ASIC 2 determines that two memory components are connected to the ASIC 2, it divides the capacity of its bus into two portions. A first portion is assigned to the first connected memory component 41, 51, 61 and the second portion to the second connected memory component 42, 52, 62. It has to be noted that the capacity does not have to be distributed equally to the two connected memory components. In particular in the case of FIG. 6, a larger portion of the capacity may be assigned to the internal memory component 62 than to the external memory component 61. Such an unequal distribution can be based on a determination of the respective kind of the connected memory components in addition to the determined number of connected memory components.

Then, the memory controller of the ASIC 2 starts an exchange of data with the first memory component 41, 51, 61 via interface pin groups 3 and an exchange of control signals with the first memory component 41, 51, 61 via interface pin group 5. At the same time, the memory controller starts an independent exchange of data with the second memory component 42, 52, 62 via interface pin group 4 and an exchange of control signals with the second memory component 42, 52, 62 via interface pin group 6. The memory controller employs the same interface protocol for the signal exchange with both memory components as for the single interface protocol in the implementations of FIGS. 2 and 3. Since each of the respective two memory components connected to the interface pins 3–6 can only use part of the capacity of the bus of the ASIC 2, the respective two memory components may be slow memory components. In case of an unequal distribution of the capacity in the case of FIG. 6, however, the internal memory component 62 should be faster than the external memory component 61, in order to enable a full exploitation of the available capacity.

Thus, the same ASIC implementation is suited to support various host implementations.

It is to be noted that the described embodiment constitutes only one of a variety of possible embodiments of the invention.

What is claimed is:

1. A hardware unit (2) for operating memory components, which hardware unit (2) comprises a memory controller, a plurality of interface pins (3–6) and a bus connected to said memory controller and to said interface pins (3–6), said memory controller determines the number of memory components (21,31,41,42,51,52,61,62) external to said hardware unit (2) and connected to said interface pins (3–6), wherein in case at least one memory component (21,31,41,42,51,52, 61,62) is determined to be connected to said interface pins (3–6), said memory controller divides the capacity of said bus into as many portions as there are connected memory components (21,31,41,42,51,52,61,62), allocates each portion to another group of said interface pins (3–6) to which a separate memory component (21,31,41,42,51,52,61,62) is connected, and exchanges signals via said bus and said interface pins (3–6) separately with each connected memory component (21,31,41,42,51, 52,61,62).

2. A hardware unit (2) according to claim 1, wherein said memory controller determines the number of memory components (21,31,41,42,51,52,61,62) external to said hardware unit (2) and connected to said interface pins (3–6) by retrieving a corresponding pre-determined value from storage means.

3. A hardware unit (2) according to claim 1, wherein said memory controller determines the number of memory components (21,31,41,42,51,52,61,62) external to said hardware unit (2) and connected to said interface pins (3–6) in an identification cycle via said bus of said hardware unit.

4. A hardware unit (2) according to claim 1, wherein said memory controller supports an exchange of signals with at least one memory component (31,51,52,62) internal to an electronic device (1) comprising said hardware unit (2) and with at least one memory component (21,41,42,61) external to said electronic device (1).

5. A hardware unit (2) according to claim 1, wherein said memory controller supports an exchange of signals with memory components (21,31,41,42,51,52,61,62) with different speeds.

6. A hardware unit (2) according to claim 1, wherein said memory controller supports an exchange of signals with a single connected memory component (21,31) using the entire capacity of said bus.

7. A hardware unit (2) according to claim 1, wherein said memory controller applies the same interface protocol for any memory component connected to said interface pins (3–6).

8. A hardware unit (2) according to claim 1, wherein said memory controller multiplies control signals required for an exchange of data signals with memory components by the number of memory components determined to be connected to said interface pins (3–6).

9. A hardware unit (2) according to claim 1, wherein said interface pins comprise two groups of pins (3,4) for a data exchange and two groups of pins (5,6) for an exchange of control signals with memory components (21,31,41,42,51, 52,61,62).

10. A hardware unit according to claim 1, wherein said memory controller supports an identification cycle via said bus and said interface pins, in which identification cycle sub-components of a memory component connected to said interface pins are identified.

11. A hardware unit (2) according to claim 1, further comprising a unit for exchanging signals via said bus and said interface pins (3–6) with a device other than a memory component, which device is connected to said interface pins (3–6), in case no memory component is connected to said interface pins (3–6).

12. A hardware unit (2) according to claim 1, wherein said hardware unit (2) is a chip.

13. An electronic device (1) comprising a hardware unit (2) according to claim 1.

14. An electronic device (1) according to claim 13, further comprising at least one internal memory component (31,51, 52,62) connected to said interface pins (3–6).

15. An electronic device (1) according to claim 13, further comprising at least one external interface (23,43,44,63) connected to said interface pins (3–6) for connecting an external memory component (21,41,42,61).

16. An electronic device (1) according to claim 13, wherein said electronic device (1) is a portable device.

17. A method for operating memory components (21,31, 41,42,51, 52,61,62) connected to interface pins (3–6) of a hardware unit (2), which hardware unit (2) further comprises a memory controller and a bus connected to said memory controller and to said interface pins (3–6), said method comprising:

determining the number of memory components (21,31, 41,42,51, 52,61,62) connected to said interface pins (3–6);

in case at least one memory component (21,31,41,42,51, 52,61,62) is determined to be connected to said interface pins (3–6), dividing the capacity of said bus into as many portions as there are connected memory components (21,31,41,42,51,52,61,62) and allocating each portion to another group of said interface pins (3–6) to which a separate memory component (21,31,41,42,51, 52,61,62) is connected; and exchanging signals between said memory controller and each memory component (21,31,41,42,51, 52,61,62) connected to said interface pins (3–6) separately via said bus and said interface pins (3–6).

18. A method according to claim 17, wherein said step of determining the number of memory components (21,31,41, 42,51, 52,61,62) connected to said interface pins (3–6) comprises retrieving a corresponding pre-determined value from storage means.

19. A method according to claim 17, wherein said step of determining the number of memory components (21,31,41, 42,51, 52,61,62) connected to said interface pins (3–6) comprises performing an identification cycle via said bus of said hardware unit (2).

20. A method according to claim 17, wherein the same interface protocol is applied for any memory component (21,31,41,42,51,52,61,62) connected to said interface pins (3–6).

21. A method according to claim 17, comprising multiplying control signals required for an exchange of data signals with memory components by the number of memory components determined to be connected to said interface pins.

22. A method according to claim 17, further comprising performing an identification cycle via said bus and said interface pins, in which identification cycle sub-components of each memory component connected to said interface pins are identified.

* * * * *